2,809,882
Patented Oct. 15, 1957

2,809,882
PROCESSES FOR CATALYTIC PURIFICATION OF OXYGEN EMPLOYING $O_3$ AND ACTIVATED ALUMINA CATALYSTS

Aristid V. Grosse, Haverford, and Edward A. Nodiff, Philadelphia, Pa., assignors to The Welsbach Corporation, Philadelphia, Pa., a corporation of Delaware No Drawing. Application December 20, 1954, Serial No. 476,592

1 Claim. (Cl. 23—221)

This invention relates to processes for the catalytic purification of oxygen employing $O_3$ and activated alumina catalysts and more particularly to such processes in which the $O_3$ is used in less than stoichiometric amounts with resulting high combustion efficiency at relatively low reaction temperatures.

In the copending application of Aristid V. Grosse and Edward A. Nodiff entitled "Processes for the Catalytic Purification of Oxygen and Catalysts Therefor," Serial No. 476,261, filed December 20, 1954, processes and suitable catalysts for use therewith are disclosed for the conversion of the combustible contaminants in oxygen to water and carbon dioxide at temperatures in the range of from approximately 200° C. to red heat. The catalysts proposed for use in these processes are described broadly as supported metal oxide mixtures and supported transition metal mixtures.

In the copending application of Aristid V. Grosse and Edward A. Nodiff entitled "Processes for the Catalytic Purification of Oxygen Employing $O_3$," Serial No. 476,591, filed December 20, 1954, processes are disclosed utilizing the catalysts and procedures of first mentioned copending application in which the combustion temperatures are sharply reduced when not less than stoichiometric amounts of $O_3$ based upon the combustible impurities in the oxygen are mixed with the oxygen before catalytic purification.

We have now found, most unexpectedly, that the combustible contaminants in oxygen can be converted to carbon dioxide and water with high combustion efficiency and at temperatures in range of from approximately 80° C. to 200° C. in the presence of an activated alumina catalyst when less than stoichiometric amounts of $O_3$ based upon the combustible impurities in the oxygen are mixed in the oxygen before catalytic combustion takes place.

It is therefore an object of the present invention to provide novel processes for the catalytic combustion of the combustible impurities in oxygen to convert the same to carbon dioxide and water with high combustion efficiency in the presence of activated alumina catalysts at relatively low temperatures in the range of from approximately 80° C. to 180° C.

Another object is to provide such processes in which less than stoichiometric amounts of $O_3$ based upon the combustible impurities in the oxygen are added to the oxygen before catalytic combustion.

Other and further objects of our invention will appear from the following description of an illustrative embodiment thereof.

The processes of this invention are capable of various procedural modifications and may be conducted at various temperatures in the presence of various activated alumina catalysts with various proportions of contaminants in the oxygen utilizing various percentages of $O_3$, less than stoichiometric amounts, in the oxygen before admission to catalytic purification. One such illustrative process is described hereinafter to illustrate the invention. This illustrative embodiment of the present invention should in no way be construed as defining or limiting the same and reference should be had to the appended claim to determine the scope of the present inventive concept.

In accordance with our invention we have found that the use of relatively mild catalysts such as activated alumina makes possible complete low temperature combustion of the organic contaminants in the oxygen stream in the presence of less than stoichiometric amounts of ozone. Thus if less than stoichiometric amounts of ozone are introduced into the oxygen stream before the oxygen stream is passed over the activated alumina complete combustion of the organic contaminants is obtained, converting them to water and carbon dioxide, at temperatures in the range of from 80° C. to 180° C. This unexpected result may be illustrated by adding acetaldehyde to the oxygen as a contaminant and then subjecting the oxygen to catalytic purification at 180° C. using an activated alumina catalyst. If 1000 p. p. m. by volume of acetaldehyde are used the same is completely oxidized to carbon dioxide and water using only 2500 p. p. m. by volume of ozone instead of the stoichiometric amount of 5000 p. p. m. of ozone.

The following table reflects data for the decontamination of an oxygen stream with a space velocity of 6000 v./v./hr. containing 1000 p. p. m. by volume of acetaldehyde utilizing an activated alumina catalyst, the catalyst being Alcoa activated alumina, grade F-10, 8-14 mesh:

Table I

COMBUSTION EFFICIENCY OF ACTIVATED ALUMINA CATALYST IN CONJUNCTION WITH VARIOUS FRACTIONS OF THE STOICHIOMETRIC AMOUNT OF OZONE

[$O_2$ rate=6000 v./v./hr., 1,000 p. p. m. $CH_3CHO$.]

| Temperature, ° C. | Fraction of Stoichiometric Amount of Ozone Used, Percent | Combustion Efficiency, Percent |
|---|---|---|
| 180 | 100 (5,000 p. p. m. by vol.) | 100 |
| 180 | 50 (2,500 p. p. m.) | 100 |
| 180 | 33 (1,667 p. p. m.) | 75 |
| 180 | 0 (0 p. p. m.) | 2 |
| 80 | 33 (1,667 p. p. m.) | 40 |
| 40 | 33 (1,667 p. p. m.) | 3 |

The combustion efficiency referred to in the table above refers to the percentage of contaminants oxidized to $CO_2$ and $H_2O$.

From this data it will be noted that at 180° C. twice as much oxidation takes place as can be accounted for on the basis of a stoichiometric reaction between ozone and the combustible contaminants. This data also shows that at temperatures below 100° C. the same results are obtained but in lesser degree.

The processes of the present invention are equally efficient for concentrations of contaminants ranging from zero to at least 1500 p. p. m. by volume and, of course, are not limited to use with acetaldehyde which is described above to illustrate the present concept. It should also be obvious that the processes of the present invention will work well with more than the specified amounts of ozone but that the greatest efficiency is obtained when the minimum amounts of ozone are employed consistent with obtaining the desired combustion efficiency.

It should now be apparent to those skilled in the art that the processes of the present invention in every way satisfy the objects discussed above.

Changes in or modifications to the above described illustrative embodiment of the present invention may now be apparent without departing from the present inventive concept and reference should be had to the appended claim to determine the scope of this invention.

What is claimed is:

In a process for the catalytic purification of oxygen containing combustible impurities the steps of mixing with the oxygen from approximately 33% to approximately 50% of the amount of ozone required to oxidize the impurities present in the oxygen and then subjecting the gaseous mixture to catalytic combustion in the presence of activated alumina catalysts at velocities approximating 6,000 v./v./hr. at temperatures in the range of approximately 80° C. to 180° C.

References Cited in the file of this patent

UNITED STATES PATENTS

| | | |
|---|---|---|
| 1,961,787 | Gilkey | June 5, 1934 |
| 2,203,188 | Beer | June 4, 1940 |
| 2,582,885 | Rosenblatt | Jan. 15, 1952 |
| 2,700,648 | Thorp | Jan. 25, 1955 |